United States Patent [19]

Sayre, III

[11] Patent Number: 5,625,687

[45] Date of Patent: Apr. 29, 1997

[54] ARRANGEMENT FOR ENHANCING THE PROCESSING OF SPEECH SIGNALS IN DIGITAL SPEECH INTERPOLATION EQUIPMENT

[75] Inventor: Clifford L. Sayre, III, Freehold, N.J.

[73] Assignee: Lucent Technologies Inc., Murray Hill, N.J.

[21] Appl. No.: 521,940

[22] Filed: Aug. 31, 1995

[51] Int. Cl.$^6$ ............... H04B 1/62; H04M 7/00; H04J 3/18; H04J 7/00
[52] U.S. Cl. ............... 379/416; 370/435; 370/532
[58] Field of Search ............... 379/416, 414, 379/1, 24, 22; 370/81, 113

[56] References Cited

U.S. PATENT DOCUMENTS

| | | | |
|---|---|---|---|
| 4,059,730 | 11/1977 | Messerschmitt et al. | 370/81 |
| 4,363,122 | 12/1982 | Black et al. | 370/81 |
| 4,408,324 | 10/1983 | Black et al. | 370/81 |
| 4,567,591 | 1/1986 | Gray et al. | 370/109 |
| 4,864,561 | 9/1989 | Ashenfelter et al. | 370/81 |
| 4,897,832 | 1/1990 | Suzuki et al. | 370/81 |
| 5,267,310 | 11/1993 | Yoshiba | 379/416 |
| 5,280,532 | 1/1994 | Shenoi et al. | 370/118 |
| 5,299,198 | 3/1994 | Kay et al. | 370/95.3 |
| 5,323,457 | 6/1994 | Ehara et al. | 379/416 X |
| 5,333,195 | 7/1994 | Bowker et al. | 379/414 X |

*Primary Examiner*—Ahmad F. Matar
*Assistant Examiner*—T. Devendra Kumar
*Attorney, Agent, or Firm*—Frederick B. Luludis

[57] ABSTRACT

A facility is provided in a telecommunications network which causes Digital Speech Interpolation (DSI) apparatus to transmit noise signals toward a destination if the level of the noise signals at least equals a predetermined threshold value, in which the predetermined threshold value is selected, in accord with an aspect of the invention, as a function of a type of telephone service subscribed to by the telephone station set involved in the associated telephone call.

8 Claims, 4 Drawing Sheets

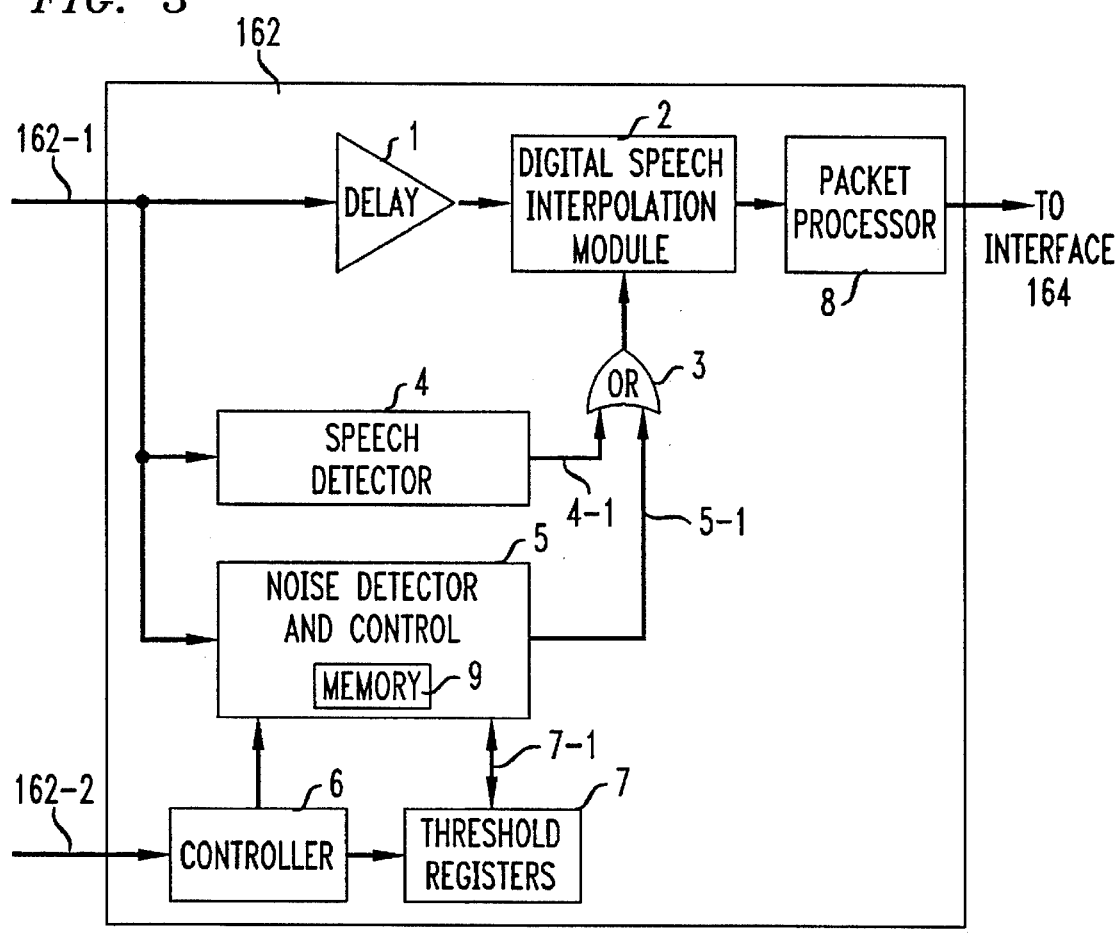

ARRANGEMENT FOR ENHANCING THE PROCESSING OF SPEECH SIGNALS IN DIGITAL SPEECH INTERPOLATION EQUIPMENT

FIELD OF THE INVENTION

The invention relates to telecommunications systems and more particularly relates to processing speech signals in the presence of noise signals.

BACKGROUND OF THE INVENTION

Telecommunications systems employ Digital Speech Interpolation (DSI) equipment to process digital speech signals that will be transmitted/received over particular transmission media, e.g., optical fiber. Such processing includes compressing the digital speech signals before they are transmitted over the transmission media. It also includes removing noise signals that may be present between speech words, i.e., during silent periods/pauses as shown in FIG. 1A. For example, FIG. 1A depicts the original signal that includes bursts of speech signals "a" having noise signal "c" superimposed on the speech signals. The noise signal is also present during silent intervals as shown at "b". Such noise signals are removed from the signal stream to achieve more efficient use of the transmission media, and, therefore, are not transmitted, except for those noise signals that are superimposed on the speech signals. When the compressed result is received at the opposite end of the connection, equipment thereat decompresses the speech signals and inserts a locally manufactured noise signal referred to as "comfort noise", e.g., a white noise signal, during such pauses in the signal stream. The receiving equipment thus manufactures and inserts the noise signals into the signal stream to simulate a typical telephone connection, as is illustrated in FIG. 1B. Specifically, the receiving equipment decompresses the signal information that it receives and outputs the result as depicted by speech signals "a". If noise signals were superimposed on speech signals, then that effect is also produced at the receiving end, as represented by signal level "c". Thus, segment "c" of the reconstructed waveform represents a composite of speech signal, signal "a", and the superimposed noise, signal "c". The receiving equipment also manufactures a predetermined level of comfort noise and inserts this during pauses in the signal stream, as depicted at "d".

I have recognized, however, that as a result of the foregoing technique the receiving party hears two different, distinct noise signals—the comfort noise and the noise superimposed on the speech signals—which the receiving party may find disconcerting, especially if the superimposed noise signal contains an appreciable level of energy. For example, if a call is being made from a very noisy environment, e.g., an airport, then it is likely that background noise having an appreciable level of energy will also be transmitted over the telephone connection. It is likely that such background noise will also be superimposed on the speech signals that will be heard by the receiving party positioned at the opposite end of the connection. The receiving party will thus hear a high level noise signal with the speech signals, but then hear a very low level comfort noise during pauses in the speech.

SUMMARY OF THE INVENTION

Prior Digital Speech Interpolation (DSI) apparatus is advanced by providing a function which discriminates noise signals from speech signals, and if noise signals are present, then comparing the level of the noise signals with a predetermined threshold value and selectively causing the DSI apparatus to compress the noise signals and send the result toward its destination if the level at least equals a predetermined threshold value, in which the predetermined threshold value is selected, in accord with an aspect of the invention, as a function of a type of telephone service subscribed to by the telephone station set involved in the associated telephone call.

BRIEF DESCRIPTION OF THE DRAWINGS

In the drawing:

FIG. 3 is a block diagram of the transmitter of FIG. 2;

FIG. 4 is an illustrative example of one way in which the transmitter of FIG. 3 tracks which communications channels are active.

DETAILED DESCRIPTION

An illustrative embodiment of the invention will be discussed in the context of an overseas (international) telephone call initiated in the U.S. to a station set located overseas, e.g., a European country. However, that is not to be taken as a limitation, since the claimed invention may be practiced in conjunction with other than an overseas call—domestic telephone call, e.g., a call between a location in California and a location in Hawaii.

Figure 1A:
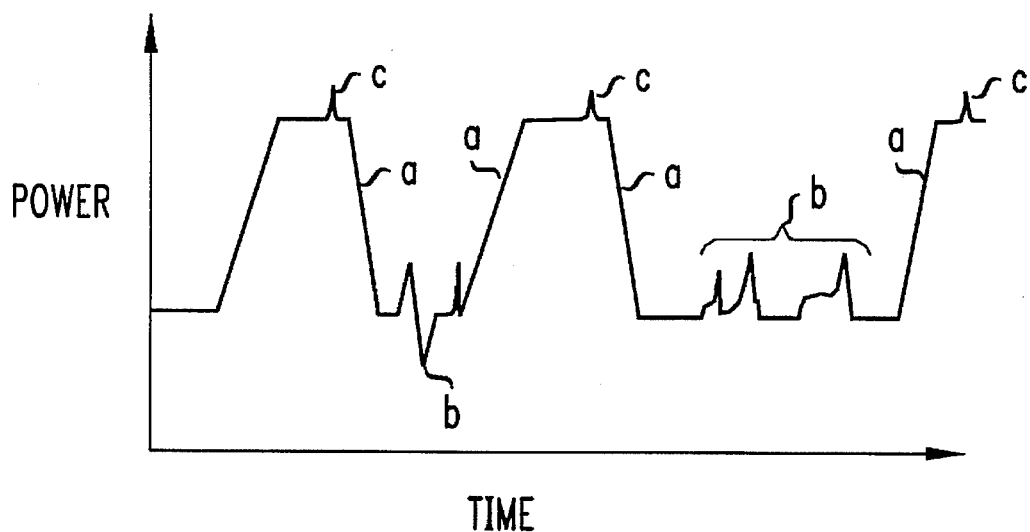
FIGS. 1A and 1B show respective examples of a composite signal in which noise is superimposed on speech signals.
Figure 1B:
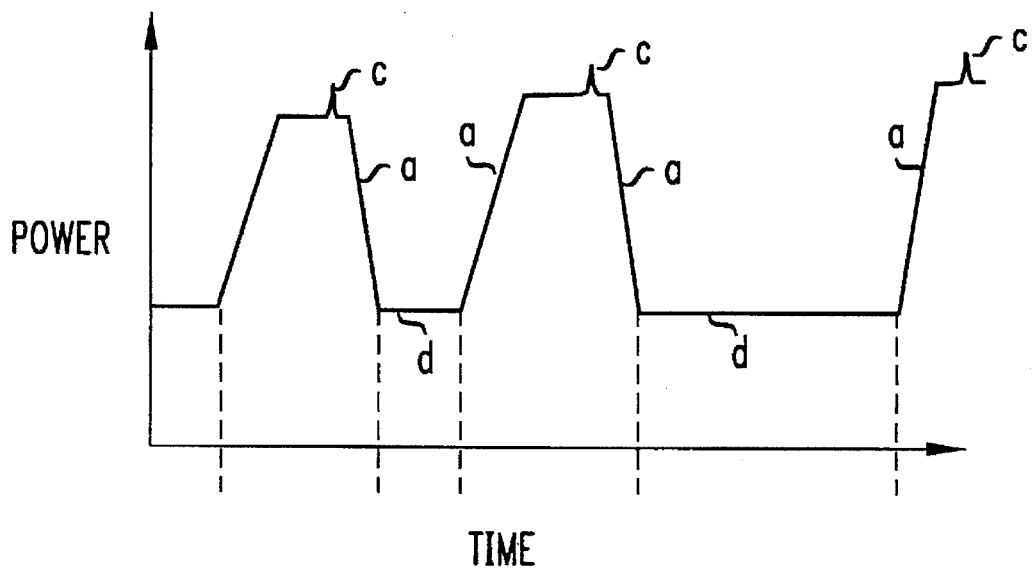
Figure 2:
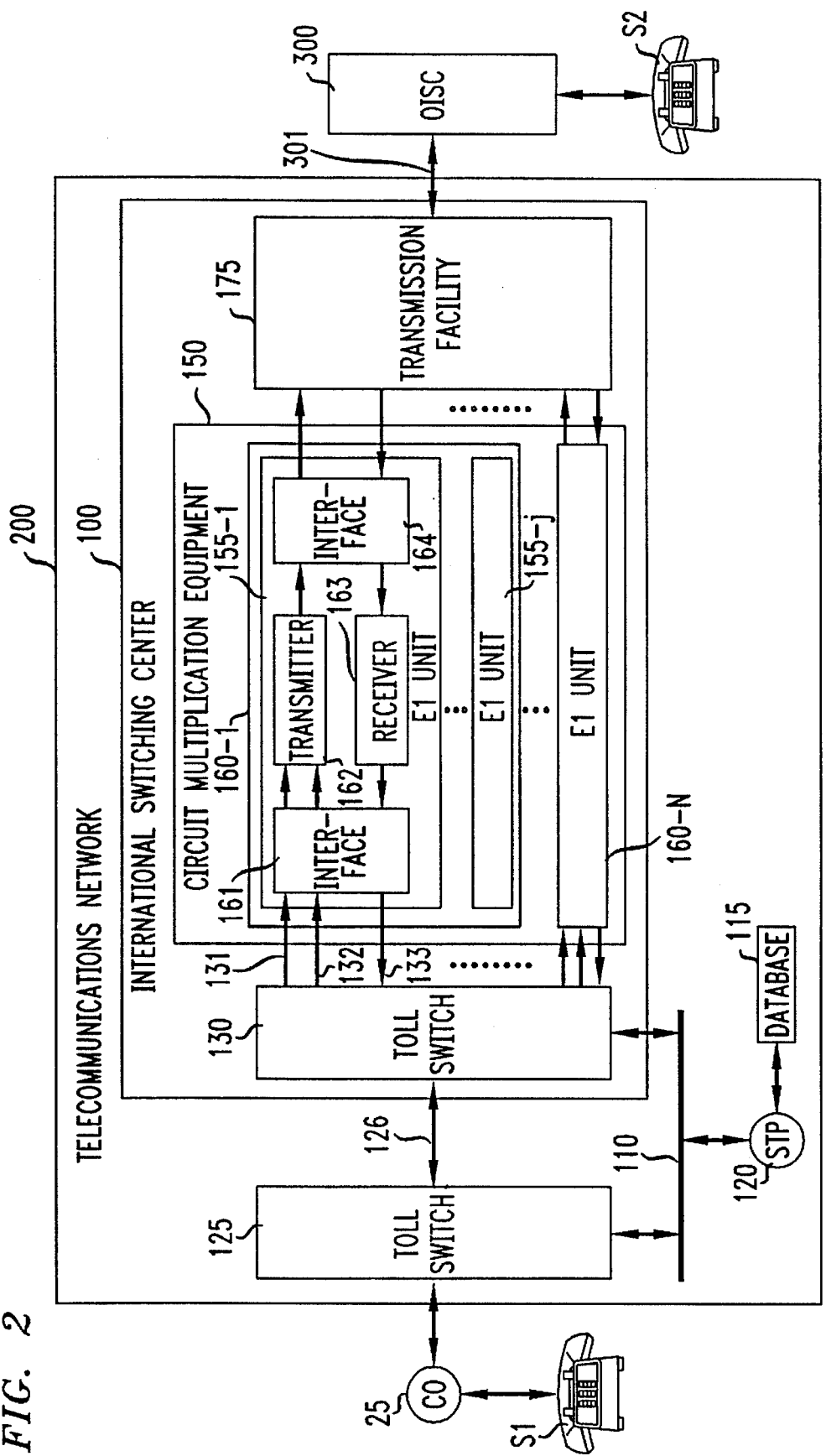
FIG. 2 is a broad block diagram of an illustrative telecommunications system in which the principles of the invention may be practiced.

With the foregoing in mind, public telecommunications network 200, FIG. 2, may be, for example, a public switched telephone network, such as, for example, the well-known AT&T network, that provides long distance telephone services for its subscribers, e.g., station S1. Network 200 includes, inter alia, a plurality of Toll Switching (TS) offices, two of which, 125 and 130 are shown in the FIG. Such switches may be any one of the well-known types of switching equipment, and includes, for example, the No. 4ESS (Electronic Switching System) available from AT&T, and are interconnected to one another via an intertoll network. In this way, the toll switches establish telephone connections between calling telephone station sets and respective called station sets. A toll switch, e.g., TS 125, may also be connected to a number of Central Offices (CO), e.g., CO 25. The operation of a central office is well-known and will not be discussed herein. However, it suffices to say that a CO is arranged to send a telephone call originated at a calling telephone station set which has dialed a particular long distance telephone number to an associated toll switch. A CO is also arranged to connect a call that the CO receives from an associated switch to a called telephone station set.

A telecommunications network may also include a number of international switching centers which connect the network to an international network located in another country, e.g., a European country, as represented by Overseas International Switching Center (OISC) 300. In this instance, the connection may be, for example, optical fiber cable, satellite, etc., as represented by the dashed portion of communications path 301.

For network 200, an International Switching Center, e.g., ISC 100, comprises, inter alia, toll switch 130. Circuit Multiplication Equipment (CME) 150 and transmission facility 175. CME 150, on the other hand, includes a plurality of, e.g., eight, so-called E1 units 160-i. These are typically configured into two groups of four E1 units. Since the E1 units are identical to one another, a discussion of one such unit, e.g., unit 160-1, will equally pertain to the other E1 units.

Specifically, an E1 unit includes, inter alia, interfaces 161 and 164 which respectively interface transmitter 162 and receiver 163 to toll switch 130 and transmission facility 175. Transmitter 162 implements a speech interpolation function as well as various aspects of the invention in unit 160-1 with respect to speech signals that it receives from toll switch 130 via interface 161. Receiver 163, on the hand, reverses the speech interpolation function with respect to compressed speech signals that it receives from interface 164. That is, receiver 163 decompresses the signals and supplies the resulting reconstructed signal to interface 161 for transmission to toll switch 130 via path 133, as will be explained below in more detail.

Assume at this point that station set S1 places a call via CO 25 to overseas station set S2 by dialing the telephone number and country code associated with S2 as well as other digits necessary to place such a call. Also assume that CO 25 forwards the call to TS 125 which, in turn, forwards the call to TS 130 of ISC 100 via an intertoll trunk interconnecting TS 125 and TS 130 via intertoll path 126. TS 125 also sends associated call information, e.g., called telephone number and ANI information associated with calling station S1, to TS 130 via a conventional signaling network, e.g., signaling network SS7, represented in the FIG. by communications network/path 110. The call information also includes a notice that the station S1 call is being forwarded to TS 130 and the identity of the path 126 intertoll trunk assigned to that call.

TS 130, in response to receipt of the call information, translates the called number into a routing identifier and establishes a connection through its switch fabric to an output port connecting to communication path 131 to forward the call toward its destination. Communication path 131, more particularly, may be a bipolar, 2.048 Mbits/sec. communications path having a plurality of digital channels, for example, 30 digital communications channels, that may be assigned to respective telephone calls. As such, TS 130 assigns an idle one of the channels to the station S1 call and therefore retransmits voice signals associated with that call and that are received via the aforementioned intertoll trunk over the assigned channel. Interface 161, in turn, converts the bipolar signals that it receives via path 131 to TTL logic levels and supplies the logic levels to transmitter 162.

TS 130 also inserts the ANI information associated with the call in a message containing a request for the type of service subscribed to by the station set associated with the ANI information. TS 130 then sends the message to NCP 115 via SS7 network 110 and STP 120. Upon receipt of the message, NCP 115 consults its database to identify the service type requested in the message. NCP 115 similarly forms a message containing the service type and sends the message to the requester, i.e., TS 130. Upon receipt of the latter message, TS 130 sends control signals to transmitter 162 via path 132 and interface 161, in which the control signals indicate the service type associated with the channel assigned to the station S1 call. Transmitter 162, in turn, stores the control signals in associated memory so that a particular transmission control may be applied to contents of the associated channel when that channel (time slot) occurs on path 162-1, as will be explained below in detail. That is, (a) if noise signals are present in that channel during any pause in the receipt of speech signals and the level of the noise signals equal or exceed a predetermined threshold; and (b) the service type associated with the call is of a predetermined type, e.g., premium; then transmitter 162 causes the speech interpolation process to be disabled (bypassed) for that channel and for the duration of the call subject to a so-called "return-to-normal" algorithm. This means that such noise signals will be compressed and transmitted to the called end of the connection and that such compression will be effectuated for the duration of the call subject to the "return-to-normal" algorithm. Thus, in accord with an aspect of the invention, the speech interpolation process is selectively disabled for noise signals based on a service type associated with a call and the level of the noise signals reaching a predetermined threshold. Also, such disablement is put into effect for the duration of the call, thereby emulating a hysteresis effect in accord with an aspect of the invention.

As will be discussed below, receiver 163 operates similarly with respect to TTL level signals that it receives from station S2 via OISC 300, path 301, transmission facility 175 and interface 164, as will be discussed below.

A more detailed block diagram of transmitter 162 is illustrated in FIG. 3 and includes conventional delay circuit 1, Digital Speech Interpolation (DSI) module 2 and speech detector circuit 4. In the prior art, speech detector 4 processes TT1 level signals received via path 162-1 during a respective channel to determine if the signals represent voice. If so, then detector 4 enabled DSI 2 via lead 4-1 to compress the signals as they were received via delay circuit 1. DSI 2 compresses such signals in accord with a well-known digital signal compression scheme, e.g., the well-known G.765 CCITT standard, and outputs the result to interface 164 for transmission to facility 175 (FIG. 2). If speech is not detected, then DSI 2 is not so enabled, which means that signals are not sent to interface 164 during the associated channel for transmission to facility 175. In this sense, prior art E1 units send only compressed speech signals to interface 164.

The claimed invention, on the other hand, selectively compresses noise signals based on whether a number of different predetermined conditions for doing so are present and sends the result in addition to compressed voice signals to interface 164. Specifically, in accord with an aspect of the invention, such selectivity is based on (a) the type of service associated with the call being processed and (b) the level of the noise signals for the assigned channel appearing at the input to noise detector 5 equaling or exceeding a predetermined threshold stored in the appropriate one of the threshold registers 7. A noise threshold value is thus associated with a particular type of telephone service and is stored in a respective one of the registers 7. In this way, a particular service type, e.g., premium service, business service, plain old telephone service, etc. may be associated with a respective threshold value.

Upon receipt of the control message from TS 130 via path 132, controller 6 translates the service type into an address associated with one of the registers 7 and sends that address along with the identity of the assigned channel (channel number) to detector 5. Detector 5, in turn, sends the address to threshold registers 7 via path 9 and receives from the latter via path 9 the contents of the identified register, which contents is the noise threshold value that is to be associated with the identified service type. Detector 5, then stores the threshold value and service type in a memory 9 location reserved for the assigned channel. That is, detector 5 accesses memory 9 using the channel number as an index. For example, if the channel number is 24, then the 24th location in memory is reserved for channel 24. In this way, detector 5 unloads a memory 9 location during the path 162-1 time interval for the associated channel and uses the unloaded contents in the processing of the signals that it receives at its input during that channel. If such contents has been cleared (i.e., equals all zeroes) then detector 5 does not process the signals since the associated channel is assumed to be idle, i.e., not active. (Note that processor 8 will be discussed below.)

One possible example of the layout of memory 9 is shown in FIG. 4. Briefly, memory 9 includes 30 memory locations one for each speech channel and each such location (or entry) comprises four fields. The active field 9-1 of an entry is set to a logic one if the associated channel is active (assigned). The service type of the call assigned to the channel is inserted in service field 9-2, and the noise threshold associated with that service type and obtained from registers 7 is inserted in field 9-3. A logic one is inserted in associated field 9-4 if DSI 2 is to be set to bypass to compress noise contained in the associated channel.

Returning to FIG. 3, assume that detector 5 is processing signals received during channel three. In that instance, detector 5 unloads the contents of the third entry and if such signals are found to be noise signals and not voice signals, then detector 5 compares the level of those signals with the value of the threshold associated with plain old telephone service (POTS), represented in FIG. 4 by the letter "D". For POTS service, threshold D is a very large value guaranteeing that the level of such noise signals will not equal or exceed that threshold, thereby preventing the enabling of DSI 2 when noise signals are present at its input during channel three. Similarly, during the next channel, detector 5 unloads the contents of the memory 9 location associated with channel four. As seen from such contents (FIG. 4), channel four is active, the call assigned to that channel is associated with premium service and the enable field 9-4 is set to logic one. Based on the latter information, detector 5 enables lead 5-1, which is presented to DSI 2 via OR circuit 3. Such enabling causes DSI 2 to compress the signals appearing at its input even though the signals may be noise signals.

More specifically, prior to setting the associated field 9-1 to a logic one, detector 5 tracks the nature of the TTL signals that are supplied to the input of DSI 2 via delay circuit 1, and path 162-1. When detector 5 determines, in accord with a conventional noise detection scheme, that such input signals constitute noise, then it compares the level of the noise signals with the threshold value "A" stored in associated field 9-3. As mentioned above, if the level of such noise meets or exceeds the threshold for premium service, i.e., threshold A, then detector 5 set field 9-4 to a logic one and enables DSI 2 via lead 5-1 to compress such signals and transmit the result to interface 164. Interface 164, in turn, converts the TTL level signals to a bipolar format and transmits that result to transmission facility 175. The setting of field 9-4 thus causes detector 5 to so enable DSI 2 for the duration of the associated call, i.e., every time the assigned channel occurs. When the call is terminated and the channel is designated as being idle, then the memory 9 location associated therewith is cleared (set to zeroes).

Figure 5:
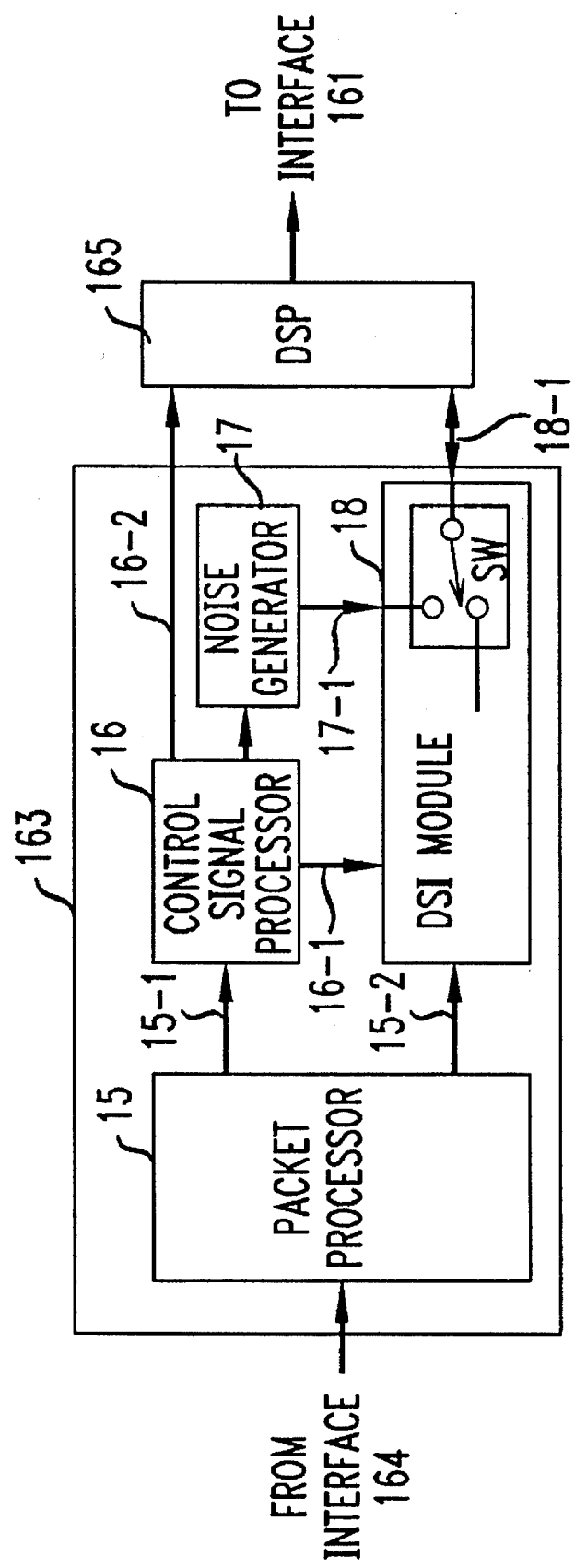
FIG. 5 is a block diagram of the receiver of FIG. 2.

Transmission facility 175, more particularly, provides a conventional interface between path 301 and network 200 based on the type of transmission media, e.g., optical fiber, satellite, etc., that implements path 301. Thus, facility 175 converts the signals that it receives from interface 164 to signals suitable for transmission via path 301. That is, packet processor 8 (FIG. 3) assembles the signals (speech information) that it receives from DSI 2 and associated control signals including, e.g., (a) conventional packet sequence number, (b) channel number, CRC code, (c) a flag indicating whether the packet contains speech or noise, (d) the level of the noise signals as measured by noise detector 5, etc., into a data packet in accordance with a standard packet algorithm, e.g., the CCITT G764 packet protocol. Processor 8 then supplies the packet to interface 164, which converts the packet signals to a bipolar format for transmission to facility 175. Facility 175 then transmits the packet over path 301 in a form suitable for that path. For example, if path 301 is a satellite connection, then the contents of the packet is transmitted as radio signals over path 301. Signals received via path 301, e.g., radio signals, or optical signals, are converted into a bipolar format for transmission to TS 130 via the interface provided by CME 150. A similar interface may be used to interface OISC 300 with path 301 to receive the packet signals, convert to a bipolar format and supply the result to a receiver for processing, for example, a receiver similar to receiver 163 shown in FIG. 5.

Specifically, receiver 163 includes packet processor 15 which processes signals received from an associated interface, e.g., interface 164. In doing so, processor 15 separates the speech information (or noise information) contained in a received packet from control information, e.g., sequence number, channel number, CRC code, etc. Processor 15 then supplies the separated control signals to control signals processor 16 via path 15-1 and the separated information content of the packet to Digital Speech Interpolator module 18 via path 15-2. Control processor checks the sequence number to determine if the sequence number is in sequence. If not, then control signal processor 16 concludes that a pause in speech might have occurred and that a burst of so-called "comfort noise" should be transmitted to the ultimate receiver of the signals. For example, if processor 16 finds that the current packet for the identified channel contains a sequence number of N+X and that the last received packet for that channel contained a sequence number of N, then processor 16 concludes that a pause in speech might have occurred for the identified channel. For such a pause, processor 16 sends a first control signal to DSI 18 which causes the latter to connect Digital Signal Processor (DSP) 165 to comfort-level noise generator 17 via paths 18-1 and 17-1 via representative switch SW.

If the packet sequence number is in sequence, then the information content (speech or noise) is supplied to DSI module 18 and control signals processor sends a second control to DSI 18 via path 16-1. The second control signal causes DSI 18 to decompress (expand) the signals that it receives via lead 15-2 and supply the result to DSP 165 via switch SW and path 18-1. If the information content is noise, then control signal processor 16 sends a signal indicative thereof to DSP 165 via path 16-2. DSP 165, more particularly, is an adaptive noise reduction filter that builds a spectral model of the noise signals and then subtracts the model from the composite speech/noise signal, i.e., a speech signal having background noise superimposed thereon. DSP 165 also subtracts the model of noise signal that it adaptively builds from the noise signal that DSI module 18 receives and decompresses. The level of noise in the signals that are thus supplied to the ultimate receiver, e.g., station S2 (FIG. 2) is greatly reduced.

The foregoing is merely illustrative of the principles of the invention. Those skilled in the art will be able to devise numerous arrangements, which, although not explicitly shown or described herein, nevertheless embody those principles that are within the spirit and scope of the invention.

The invention claimed is:

1. Apparatus for use in a telecommunications system comprising a communication path for receiving speech signals associated with a telephone call, said communication path also transporting noise signals at least during pauses in the receipt of said speech signals, first means for discriminating said speech signals from said noise signals and forwarding said speech signals when they are present on said communications path to a predetermined destination switch via another communication path such that said speech signals are compressed in accordance with a predetermined compression scheme and then forwarded to said destination, and second means for discriminating said noise signals from said speech signals and, responsive to the presence of said noise signals on said communications path, comparing the level of said noise signals with a predetermined threshold value and for selectively causing said first means to compress said noise signals and forward the compressed noise signals to said destination switch if said level at least equals said predetermined threshold value, in which said predetermined threshold value is selected as a function of a type of telephone service associated with said telephone call.

2. The apparatus set forth in claim 1 further comprising means for ensuring that said level is less than said predetermined threshold when said call is associated with plain old telephone service.

3. The apparatus set forth in claim 1 further comprising means at said destination switch and responsive to an absence of said noise signals on said other communication path during said pauses for generating predetermined noise signals and sending said generated noise signals to a receiving party.

4. The apparatus set forth in claim 1 further comprising at said destination switch means for receiving said compressed noise signals and for decompressing compressed noise signals in accordance with said predetermined compression scheme, and means for generating adaptively a model of the spectral energy of said decompressed noise signals and for subtracting said model from subsequently received speech signals that have been decompressed.

5. Apparatus for use in a telecommunications system comprising means for receiving speech sianals from a first telephone station set during a telephone call and for receiving background noise during pauses between segments of said speech signals, means for discriminating between said speech signals and said noise signals and for forwarding said speech signals to a second telephone station set connected to said first telephone station set via a connection established by said telecommunications system, means, operative in the event that said first telephone station set subscribes to a particular service provided by said telecommunications system and noise signals are being received from said first telephone station set during said pauses, for causing said discriminating means to forward said noise signals to said second telephone station set, means for receiving said forwarded speech and noise signals and adaptively modeling a spectral equivalent of the energy contained in said noise signals and subtracting the result of said modeling from said speech signals to reduce any noise component that may be contained in said speech signals and forwarding the result to said second telephone station set, and wherein said means for causing includes means, responsive to the receipt of said noise signals from said first telephone station, for comparing the level of said noise signals with a predetermined threshold value and for selectively causing said means for discriminating to forward said noise signals to said second station set if said level at least equals said predetermined threshold value and if said first telephone station set subscribes to said particular service.

6. The apparatus set forth in claim 5 further comprising means for ensuring that said predetermined threshold is greater than said level when said telephone call is associated with plain old telephone service.

7. The apparatus set forth in claim 5 wherein said means for comparing includes means, responsive to an indicator indicating that the level of said noise signals is less than said predetermined threshold value, for generating a predetermined noise signal and sending said generated noise signal to said second telephone station set.

8. A method for use in a telecommunications system comprising receiving via a communication path speech signals associated with a telephone call, said communication path also transporting noise signals at least during pauses in the receipt of said speech signals, discriminating said speech signals from said noise signals and forwarding said speech signals when they are present on said communications path to a predetermined destination switch via another communication path such that said speech signals are compressed in accordance with a predetermined compression scheme and then forwarded to said destination, and discriminating said noise signals from said speech signals and, responsive to the presence of said noise signals on said communications path, comparing the level of said noise signals with a predetermined threshold value and selectively causing said noise signals to be compressed and forwarded to said destination switch if said level at least equals said predetermined threshold value, in which said predetermined threshold value is selected as a function of a type of telephone service associated with said telephone call.

* * * * *